United States Patent
Dasgupta et al.

(10) Patent No.: US 10,140,287 B2
(45) Date of Patent: Nov. 27, 2018

(54) SCALABLE AND ACCURATE MINING OF CONTROL FLOW FROM EXECUTION LOGS ACROSS DISTRIBUTED SYSTEMS

(71) Applicant: International Business Machines Corporation, Armonk, NY (US)

(72) Inventors: Gargi Banerjee Dasgupta, Bangalore (IN); Atri Mandal, Bangalore (IN); Animesh Nandi, Bangalore (IN); Anindya Neogi, Bangalore (IN); Sriram Raghavan, Chennai (IN); Suriya Subramanian, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 508 days.

(21) Appl. No.: 14/848,970

(22) Filed: Sep. 9, 2015

(65) Prior Publication Data
US 2017/0068709 A1  Mar. 9, 2017

(51) Int. Cl.
| G06F 17/30 | (2006.01) |
| G06F 17/27 | (2006.01) |
| G06F 11/30 | (2006.01) |
| G06F 17/24 | (2006.01) |

(52) U.S. Cl.
CPC ......... *G06F 17/2785* (2013.01); *G06F 11/30* (2013.01); *G06F 17/248* (2013.01); *G06F 17/30705* (2013.01)

(58) Field of Classification Search
CPC .... G06F 17/2785; G06F 11/30; G06F 17/248; G06F 17/30705

USPC ........................................................ 707/776
See application file for complete search history.

(56) References Cited

U.S. PATENT DOCUMENTS

| 8,495,429 B2 | 7/2013 | Fu et al. |
| 8,997,256 B1 | 3/2015 | Rogers et al. |
| 2010/0153785 A1* | 6/2010 | Keromytis .............. G06F 11/08 714/38.11 |
| 2011/0029817 A1* | 2/2011 | Nakagawa .......... G06F 11/0709 714/37 |
| 2011/0185234 A1* | 7/2011 | Cohen ................. G06F 11/3476 714/37 |
| 2014/0165193 A1* | 6/2014 | El-Rafei ............. G06F 11/0715 726/22 |

(Continued)

OTHER PUBLICATIONS

Li, Tao, et al., "An Integrated Framework on Mining Logs Files for Computing System Management", KDD '05, Aug. 21-24, 2005, Chicago, Illinois, USA, 6 pages, ACM Digital Library.

(Continued)

*Primary Examiner* — Evan Aspinwall
(74) *Attorney, Agent, or Firm* — Ference & Associates LLC

(57) ABSTRACT

Methods and arrangements for efficiently mining a control flow graph from execution logs of a distributed system. Using at least one text clustering technique, two text clusters are generated from the plurality of execution logs. At least one approximate template is generated based on the at least two text clusters. At least one refined template is created via refining the at least one approximate template using multi-modal sequencing. The control flow graph is created based on the at least one refined template. An anomaly is detected in the control flow graph.

13 Claims, 11 Drawing Sheets

(56) References Cited

U.S. PATENT DOCUMENTS

| | | | | |
|---|---|---|---|---|
| 2014/0172371 | A1* | 6/2014 | Zhu | G06F 11/0709 702/185 |
| 2014/0344622 | A1* | 11/2014 | Huang | G06F 11/079 714/37 |
| 2016/0124792 | A1* | 5/2016 | Togawa | G06F 11/079 714/37 |
| 2016/0219066 | A1* | 7/2016 | Vasseur | H04L 63/1425 |
| 2017/0010931 | A1* | 1/2017 | Agarwal | G06F 11/079 |
| 2017/0063887 | A1* | 3/2017 | Muddu | H04L 63/1425 |
| 2017/0300532 | A1* | 10/2017 | Simhon | G06F 17/30495 |

OTHER PUBLICATIONS

Sabato, Sivan, et al., "Analyzing System Logs: A New View of What's Important", Second Workshop on Tackling Computer Systems Problems with Machine Learning Techniques (SysML07), Apr. 10, 2007, Cambridge, MA, USA, 9 pages, Usenix Association, Berkeley, CA, USA.

Tan, Jiaqi, et al., "SALSA: Analyzing Logs as State Machines", First USENIX Workshop on the Analysis of System Logs (WASL '08), Dec. 7, 2008, San Diego, CA, USA, 9 pages, Usenix Association, Berkeley, CA, USA.

Lou, Jian-Guang, et al., "Mining Invariants from Console Logs for System Problem Detection", 2010 USENIX Annual Technical Conference, Jun. 22-25, 2010, Boston, MA, USA, 17 pages, Usenix Association, Berkeley, CA, USA.

Fu, Qiang, et al., "Execution Anomaly Detection in Distributed Systems through Unstructured Log Analysis", The Ninth IEEE International Conference on Data Mining (ICDM 2009), Dec. 6-9, 2009, Miami, FL, USA, 11 pages, IEEE Computer Society, IEEE Digital Library.

Lou, Jian-Guang, et al., " Mining Program Workflow from Interleaved Traces", KDD '10, Jul. 25-28, 2010, Washington, D.C., USA, 10 pages, ACM Digital Library.

* cited by examiner

| Template Pattern | Frequency |
|---|---|
| CTRTHRED :: <P> assigned to Thread[Thread-<P>--<P>,<P>,Default] | 35K |
| closing the socket: Socket[addr=/<P>.<P>.<P>.<P>,port=<P>,localport=<P>] | 35K |
| Warning: can't get <P> lock instance. | 15K |
| getLockType: Task name <P> not found. WRITE lock is used | 15K |
| SaveAreaDir:DirectoryData.getObject(): className=com.ibm.hsc.dir.impl.<P>; versionString=<P>; offset=<P>; length=<P> | 4.5K |
| calling doFSPCommand: SET_PARTITION_<P> vport=<P> tg=<P> op=<P> ip=<P>.<P>.<P>.<P> | 850 |
| FSP_LOCK_TRACE :: causeDeadLock() <> <P> = <P>: lockReqId: <P>, lockType: <P>, reqStatus: <P>, threadName: <Thread-<P><P>> | 550 |
| getIOSlotsInfo --> response = {ERROR_TYPE=<P>, REMAIN_SLOT_NUM=<P>, IO_SLOT_LIST=[Ljava.lang.Object;@<P>, REPEATS=<P>} | 44 |

FIG. 2

SCALABLE AND ACCURATE MINING OF CONTROL FLOW FROM EXECUTION LOGS ACROSS DISTRIBUTED SYSTEMS

BACKGROUND

Generally, computer systems generate logs for troubleshooting that can be good indicators of brewing problems. These logs contain valuable information associated with the run-time behavior of the system (e.g., whether transactions are going through successfully). Unfortunately, the large volume of the logs makes sifting through the data manually unfeasible and the complexity of the distributed systems lowers the efficiency of any manual diagnosis. Methods and applications currently exist that can mine these logs and subsequently create a control flow graph (CFG) that can be used to identify anomalous system behavior. However, these conventional methods all contain a variety of limitations that prevent them from accurately reporting all possible deviations in execution flow. To date, users have lacked a sufficiently efficient method for scalable high precision mining of the CFG from logs.

BRIEF SUMMARY

In summary, one aspect of the invention provides a method of efficiently mining a control flow graph from execution logs of a distributed system, said method comprising: utilizing at least one processor to execute computer code that performs the steps of: receiving a plurality of execution logs; generating, using at least one text clustering technique, at least two text clusters, from the plurality of execution logs; generating at least one approximate template based on the at least two text clusters; creating at least one refined template via refining the at least one approximate template using multimodal sequencing; creating the control flow graph, based on the at least one refined template; and detecting at least one anomaly in the control flow graph.

Another aspect of the invention provides an apparatus for efficiently mining a control flow graph from execution logs of a distributed system, said apparatus comprising: at least one processor; and a computer readable storage medium having computer readable program code embodied therewith and executable by the at least one processor, the computer readable program code comprising: computer readable program code that receives a plurality of execution logs; computer readable program code that generates, using at least one text clustering technique, at least two text clusters, from the plurality of execution logs; computer readable program code that creates at least one refined template via refining the at least one approximate template using multimodal sequencing; computer readable program code that creates the control flow graph, based on the at least one refined template; and computer readable program code that detects at least one anomaly in the control flow graph.

An additional aspect of the invention provides a computer program product to efficiently mine a control flow graph from execution logs of a distributed system, said computer program comprising: at least one processor; and at least one processor; and a computer readable storage medium having computer readable program code embodied therewith and executable by the at least one processor, the computer readable program code comprising: computer readable program code that receives a plurality of execution logs; computer readable program code that generates, using at least one text clustering technique, at least two text clusters, from the plurality of execution logs; computer readable program code that creates at least one refined template via refining the at least one approximate template using multimodal sequencing; computer readable program code that creates the control flow graph, based on the at least one refined template; and computer readable program code that detects at least one anomaly in the control flow graph.

An additional aspect of the invention provides a method of efficiently mining the control flow graph from execution logs of a distributed system, said method comprising: utilizing at least one processor to execute computer code that performs the steps of: receiving a plurality of execution logs; mining at least one template from the plurality of execution logs in the first-phase; said mining comprising creating at least one template, via employing a two-stage template mining technique; said first-stage creating approximate-templates via a dictionary based logline transformation in order to attain scalability and said second-stage refining the mined approximate-templates by leveraging the multimodal (text+temporal-vicinity) signature of each approximate-template; and generating the control-flow graph between the mined templates in the second-phase via a two-stage technique; said first-stage creating for each template, the set of its temporally co-occurring templates referred to as its Nearest-Neighbor-Group by leveraging the time-series of occurrence of each template; and said second-stage, in a single-pass of the logstream, determining for each template, its immediate predecessors/successors by tracking predecessors/successors on the projected logstream on the Nearest-Neighbor group of the template, and stitching the mined successors of each template to construct the desired control flow graph.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 provides an illustrative example of a template for mining.

DETAILED DESCRIPTION

Figure 1:
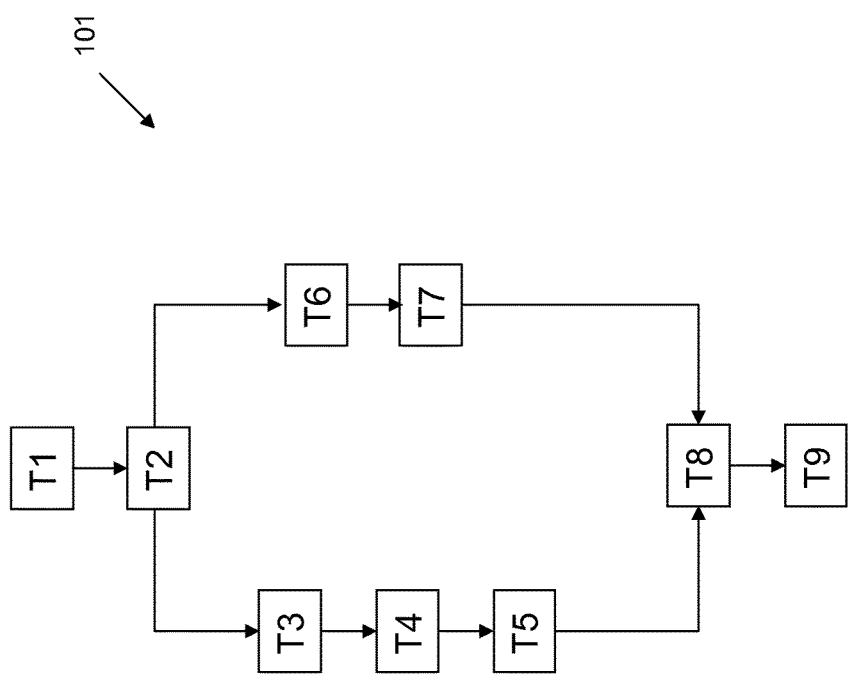
FIG. 1 schematically illustrates a general control flow graph.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1-11. It should be appreciated that the processes, arrangements and products broadly illustrated therein can be carried out on, or in accordance with, essentially any suitable computer system (including smartphones, tablets, etc.) or set of computer systems, which may, by way of an illustrative and non-restrictive example, include a system or server such as that indicated at 12' in FIG. 11. In accordance with an exemplary embodiment, most if not all of the process steps, components and outputs discussed with respect to FIGS. 1-10 can be performed or utilized by way of a processing unit or units and system memory such as those indicated, respectively, at 16' and 28' in FIG. 11, whether on a server computer, a client computer, a node computer in a distributed network, or any combination thereof.

Broadly contemplated herein, in accordance with at least one embodiment of the invention, are methods and arrangements that provide for an automated system to more efficiently mine system logs across distributed systems, create a control flow graph (CFG) and report anomalies when the CFG is violated. This can be accomplished in two primary steps. The first step involves mining templates using a two-part text-clustering approach to attain scalability and then subsequently using a multimodal signal to accurately mine the templates. The second step involves mining template sequences in order to construct a CFG through a two-stage process by first mining temporally occurring templates and computing nearest-neighbor search (NNS) groups per template and then projecting the logstream on a per NNS group basis to efficiently mine template sequences in the presence of interweaved log traces or long sequences.

The features discussed above, and others, relating to at least one embodiment of the invention, will be better appreciated from the discussion which follows.

In accordance with a general background relative to at least one embodiment of the invention, there has been a marked increase in the number of ITOA (Information Technology Operational Analytics) systems that resort to execution logs of a distributed system for problem diagnosis. Conventional efforts have involved, at a very rudimentary level, mining a control flow graph (CFG) from execution logs of a healthy system and comparing the CFG mined at runtime with a healthy-state CFG to detect anomalous deviations from expected behavior.

In contrast, in accordance with at least one embodiment of the invention, there are broadly contemplated herein techniques which: overcome application instrumentation requirements or application specific assumptions made in prior approaches, improve the accuracy of mined CFGs in the presence of high amount of interleaving of logs from multithreaded executions of the same module or different modules; serve to further annotate the CFG with information on paths taken under different conditions; categorize and score anomalies in a way that permits more effective management of anomaly alerting; and greatly improves the scalability of a CFG mining process in terms of volume of log data that can be processed per day.

In accordance with a general background relative to at least one embodiment of the invention, and as noted heretofore, system logs contain valuable information about the run-time behavior of a system. Manual analysis of these logs is inefficient because it would involve searching through gigabytes of data and millions of log records. A solution involves automatically extracting "templates" from collections of log records and portraying these in a CFG, which would better facilitate template-level analysis, navigation, and exploration. From the CFG, anomalous run-time behavior can be more easily visualized and un-optimized code paths become apparent and can be used for code refactoring. Other benefits of log reduction include compact visualization and higher-order trend analysis. However, conventional methods for mining CFGs are inefficient because they present inherent limitations that make them cumbersome to implement and prevent them from broadcasting all types of anomalous system behaviors.

As such, in accordance with a general background relative to at least one embodiment of the invention, conventional solutions have proven to be unproductive or inefficient. For instance, mining the CFG from program-source-code or executable binaries is limiting because the source-code is not available in most cases and inferences drawn from executable binaries do not work in distributed loosely-coupled micro-services architecture. Another conventional method involves raising anomaly alerts on logs based on explicit knowledge of application-level catch-phrases (e.g., warning, error codes, etc.). However, the dictionary of catch-phrases is application-dependent and this approach cannot track deviations in program/execution flow that look benign, but are in fact erroneous. A further conventional approach involves mining the CFG through explicit instrumentation of transaction-IDs in order to undertake distributed-tracing of event-messages. This approach requires explicit source-code instrumentation, which is cumbersome because the subset of services/modules is typically third-party and such instrumentation is normally highly impractical. Yet a further conventional approach involves raising anomalies based on the volume and distribution of templates and message types. However, this approach only tracks gross changes to the expected frequency and distribution, and therefore cannot track rare violations. Furthermore, benign changes to the volume of transactions get flagged as false-positives, in spite of no violations.

In accordance with at least one embodiment of the invention, there are broadly contemplated herein methods and arrangements for scalable high precision mining of CFG from logs. Such mining can use text similarity as well as CFG neighborhood and temporal information. As such, FIG. 1 provides a simplified view of a CFG 101. In general, a high level approach can involve observing a healthy system under circumstances of smooth functioning, as a "training period". In the training period, the logs are mined to build a model of what is healthy. This model is subsequently displayed in a specific way using a CFG or an abbreviated CFG. Once a notion of a healthy model has been identified, the specifications in the model can be compared at runtime to subsequent logs of a system to see if they are being followed or if there is a deviation. Any deviations can essentially be regarded as anomalies.

In accordance with at least one embodiment of the invention, in the CFG 101, T1, T2, etc., are the print statements of a code. The manifestations of the print statements are all that are observed. Items that are not printed are not in the log and cannot be observed. When looking at the CFG 101, first T1 occurs, then T2 occurs. After T2, either T3 or T6 can occur. After T5 and T7 occur, they merge again at T8 and so on. CFG can imply a set of roots; e.g., T1 should be followed by T2 and then, regardless of whether it takes the T3 path or T6 path, it should be followed by T8 and T9. What is important to observe here is that even if the source code is available, the source code does not disclose which paths in the source code are taken. Conversely, valuable information is available through observation of the logs. The code paths are frequently being identified so that they can be optimized.

In accordance with at least one embodiment of the invention, there are generally two phases of mining a CFG from logs: mining templates and mining sequences of the templates. With respect to mining templates, each log line is essentially an artifact of the print statement. In a print statement, there are typically some words and some parameters. A template is simply when all the parameters are replaced with parameter placeholders "<P>", as shown in FIG. 2. So it is possible for the same template to contain several log lines that have the same word but have different instantiations of the parameters. With respect to mining sequences of the templates, after a log line is mapped to a template, it should be observed which templates typically occur one after another, which is essentially the sequences in the CFG. Once the sequences between templates are mined, they can be stitched together and the ultimate CFG can be mined.

Figure 3:
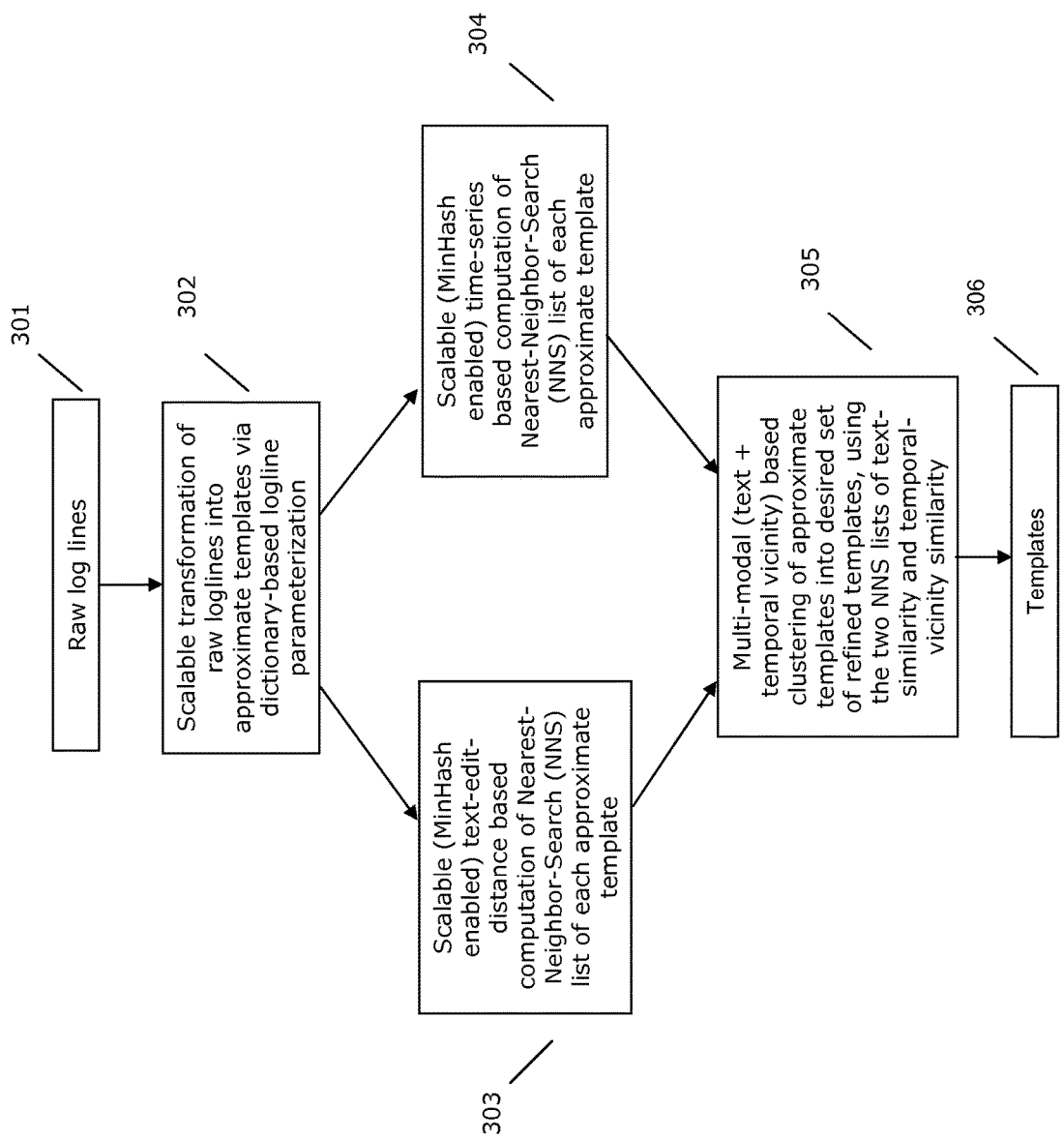
FIG. 3 sets forth a process more generally for provides the series of steps involved in the first-phase that mines templates.
Figure 4:
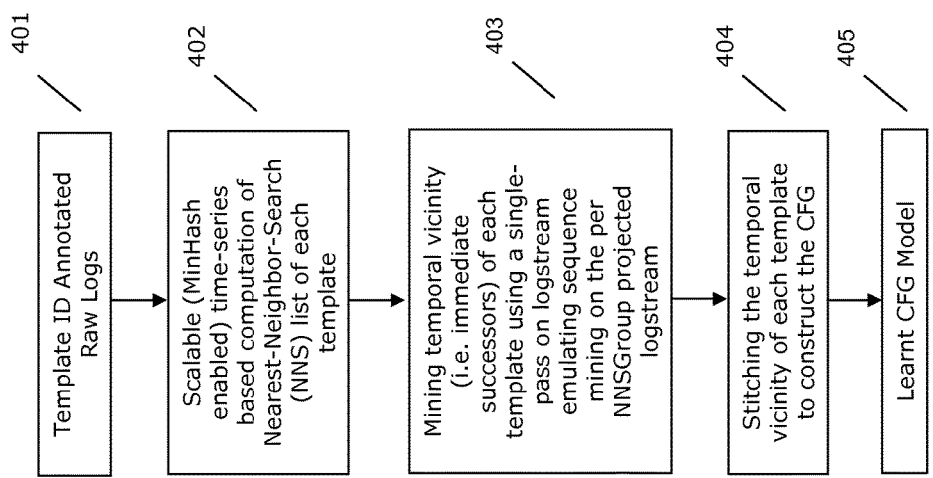
FIG. 4 sets forth a process more generally for the series of steps involved in mining template sequences or the CFG.

In accordance with at least one embodiment of the invention, by way of an illustrative example, FIG. 3 and FIG. 4 describe the two phases involved in high precision mining of a CFG from logs. Illustrated in accordance with FIG. 3 is the first phase of template mining and FIG. 4 shows the second phase of template sequence mining, which will be better appreciated from the ensuing discussion.

Thus, in accordance with at least one embodiment of the invention, given raw log lines 301, it can be understood that directly running clustering on a large number of lines (e.g., on the order of 1 billion) can be seen to present scalability issues. Furthermore, given how indistinguishable template words and parameters can be, using text alone is not sufficient to map log lines to a template. Thus, to ensure scalability, a first pass is made on the raw log lines 301 to construct approximate templates (302) using a dictionary-based transformation of raw log lines 301. This first pass involves dictionary-based logline parameterization, via identifying the keywords and parameters for each log record. The keyword detection is done based on the frequency analysis of words in the log. Annotators are also used to identify certain parameter types. The relative position of the invariants and parameters gives an approximate template signature. The output of this phase is a list of approximate templates; it should be appreciated that this number of templates is typically very small compared to the original number of log records. The approximate template-pattern is formed by retaining keywords that are above a frequency-cutoff threshold and replacing keywords that are below the frequency-cutoff threshold with a parameter place-holder.

In accordance with at least one embodiment of the invention, the approximated templates produced by the above-described first phase (of template mining) are not completely noise-free as some of the parameters may still be indistinguishable from keywords. Therefore, as part of a second phase of refinement of these approximate templates, an edit-distance based text-similarity combined with temporal-vicinity based similarity of the approximate templates can be applied to map the approximate templates that correspond to the same print statement into the same cluster, wherein each cluster corresponds to a refined template. The intuition behind using the joint-signal of text-similarity and temporal-vicinity similarity is that two instances of the same print-statement should not only look be similar with regard to the text-similarity, they should also have similar temporal-vicinities. On the contrary, even if the instances corresponding to two different print statements might look similar if they share a long common parameter and also have additional overlapping words, their temporal-vicinity will be quite different. Thereby, using the temporal-vicinity similarity information in addition to the text-similarity information, the fundamental challenges of the indistinguishability of print statement words and parameters of arbitrary length can be overcome.

The similarity in the text signal between two approximate templates is determined based on the text-based edit-distance between them, while the similarity in the temporal-vicinity signal between two approximate templates is determined based on the similarity of the NNS Group of temporally co-occurring approximate templates of each. The joint multi-modal similarity metric is a weighted combination of the similarity in the text signal and the similarity in the temporal-vicinity signal, merging approximate-templates that have a high joint-similarity metric into the same template-cluster and moving to the next clustering iteration where more template-clusters will get merged in each iteration. Finally, the clustering iteration stops when no more merges of template-clusters are possible.

A template pattern is assigned to each template cluster, wherein the template cluster pattern/label is determined via longest-common-subsequence (LCS) on the list of tokens in the text patterns of the approximate templates. This assignment introduces parameter placeholders between tokens in the above computed list of LCS tokens depending on whether or not the tokens were always observed to be consecutive.

To this end, in accordance with at least one embodiment of the invention a multi-modal signal of text and CFG predecessor/successor is used to accurately map transformed log lines to the refined templates to ensure template quality.

With respect to FIG. 3, this corresponds to the step of computing the nearest-neighbors with regard to edit-distance based text similarity (i.e., step 303) and also the nearest-neighbors (NNS) with regard to the time-series of each approximate template (i.e., step 304). The computation of NNS members based on either text-similarity or based on time-series can be done efficiently by using a scalable Nearest-Neighbor-Search (NNS) algorithm like MinHash. The input feature vector when computing NNS based text-similarity is the list of text tokens in the approximate template. The input feature vector when computing NNS based on time-series similarity is the list of time-bins where the approximate template was observed to occur. The time-bins are computed based on discretizing the time-series into a frequency of occurrence in each time-bin, wherein the time-bin-width should be approximately a few multiples (at most 10 times) of the average lag of CFG edges.

If the time-series based nearest-neighbors of one approximate template is similar to the nearest-neighbors of another approximate template, the two approximate templates essentially have the same temporal vicinity and have a potentially high chance of corresponding to the same print statement. With regard to text-similarity, if two approximate templates are top-ranked NNS members with low text-based edit-distance, then the two approximate templates have a high chance of corresponding to the same print statement. If for a pair of templates both the text-similarity and the temporal-vicinity similarity is high, it implies with very high confidence that the two approximate templates indeed correspond to the same print statement and thereby can be merged into the same template cluster. When two approximate templates are merged, the NNS lists are then computed, as necessary, on the basis of the new set of partially formed template clusters. This step of merging template-clusters continues based on the multi-modal signal of (text-based edit-distance+time-series based temporal-vicinity) (i.e., step 305). If no more merges are possible, the iteration completes and the list of partially formed template clusters are essentially the set of refined templates (i.e., 306).

After the templates are computed in the first-phase as described above, the second-phase is run with the goal of mining template sequences in order to construct the CFG (405) as shown in FIG. 4. This is achieved through a two-stage approach. The first stage (402) operates on the template-id annotated logs (401) and mines temporally occurring templates and subsequently calculating the nearest-neighbor groups (NNSGroups) per template. The second stage (403) projects the logstream on a per NNS group basis to efficiently mine template sequences in the presence of interleaved log traces or long sequences. The aforementioned two-stage approach can be efficiently realized via 2-passes on the input logstream, with the NNS groups of the templates being computed using one-pass of the logstream, and the CFG edges between templates being computed in the second phase that emulates sequence-mining over the per-NNS group projected logstream. The successor edges of each template can then be stitched together (404) to construct the desired CFG (405).

Details and specific embodiments of realizing the two-stage approach will be described regarding the novel proposal of a two-stage approach to mining template sequences from interleaved logs that are produced by a multi-threaded or distributed multi-node application.

In spite of a vast amount of literature on classical sequence mining, these approaches are not even applicable to the problem contemplated herein. A pre-requisite to classical sequence mining is clearly demarcated transactions. It operates on a set of transactions, and for each transactionid, has information of the observed sequences for that specific transactionid. Given the observed sequences for different transactionids, classical sequence mining mines the frequent common sequences that occur in most of the transactions. For the problem setting, the interleaved logs from different multithreaded executions of the same module or different modules results in the lack of any form of transaction demarcations (which is the common pre-requisite for all sequence mining techniques proposed in literature).

Although classical sequence mining is not applicable for the problem setting as described above, one can however envision imposing some notion of transacttionids on the interleaved logs by fragmenting the logstream into chunks based on some assumption of the end-to-end lag of a CFG execution. Classical sequence mining in general is known to suffer from the computation time increasing exponentially with the length of the sequences. Given that many real-world log datasets have lots of long sequences, resorting to classical sequence mining seems to be far from desirable. Further, a typical distributed application can have thousands of templates, an order of magnitude more sequences, and also longer sequences which lead to a significant exponential increase in computation time.

Figure 5:
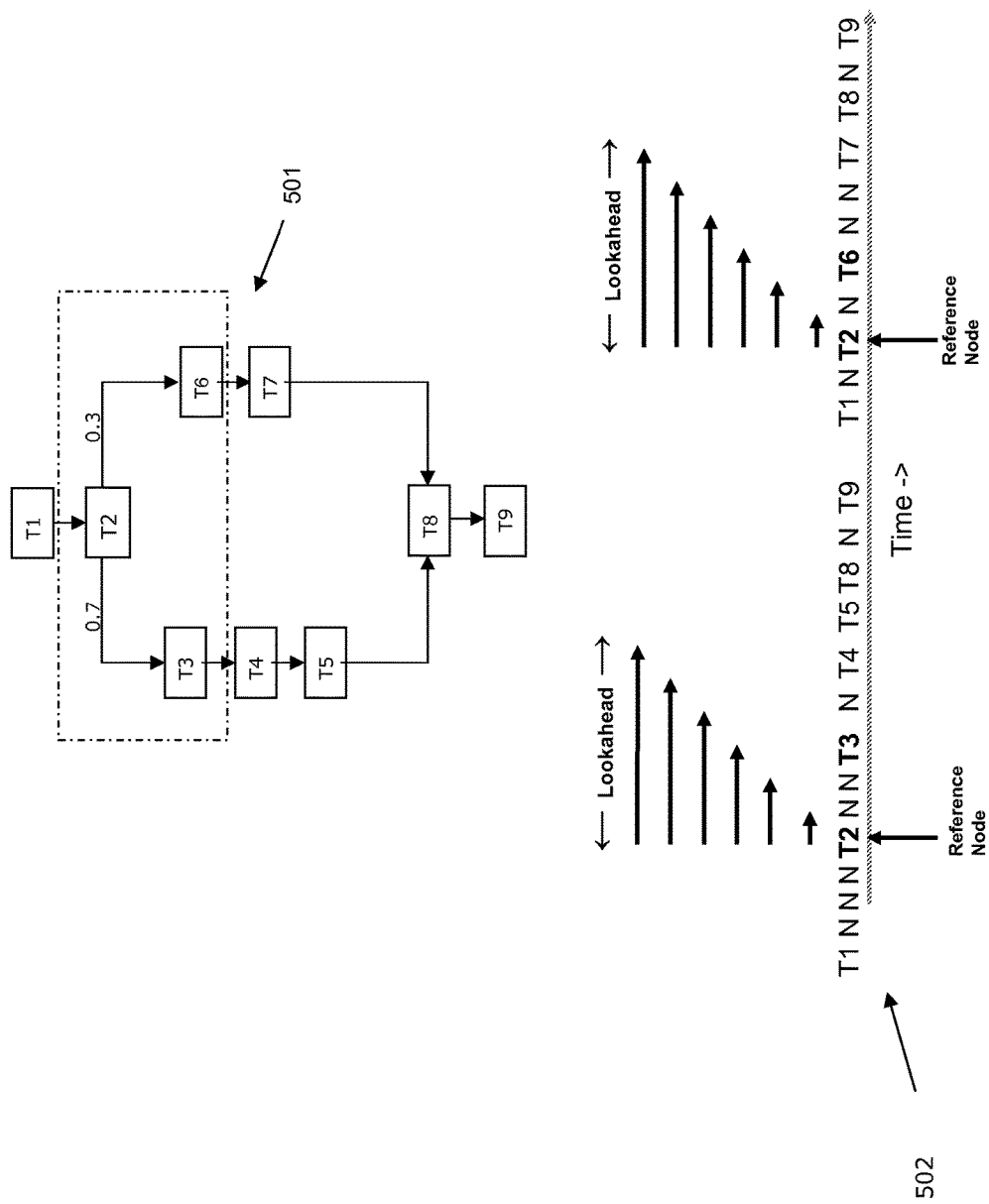
FIG. 5 provides an illustrative example of a strawman approach to mine template sequences.

In accordance with at least one embodiment, a single-stage approach to mining template sequences from the interleaved logs will not prove efficient. FIG. 5 describes a generic approach that attempts to mine template sequences in a single-stage (i.e., using a single-pass on the input logstream). The CFG can be constructed by stitching together the temporal-vicinity's (i.e., successors) of each templateid, implying that only mining for each template is necessary to determine what its children or successors in the CFG are. The figure shows the interleaved input logstream (502) resulting from interleaved executions of the CFG (501) with itself or executions of CFGs of other modules of the application. The "Ns" located on the interleaved logstream are noisy candidate templates that appear due to interleaving. As an example, a sub-goal is to mine the children of T2, in other words, to mine the existence of the edge T2→T3 and T2→T6. One type of methodology is to track the reference node (here T2) and increment the counter of the templateid that is seen immediately following the logline of the reference node. Note, however, observance beyond the immediate next line is necessary as the templateid that occurs immediately after the reference node could very well be a noisy templateid (i.e., a templateid from another multi-threaded execution of this CFG or for that matter an execution of a very different unrelated CFG related to a very different module of the application.

Although this strawman approach of a look ahead window based on the incrementing of counters of templates observed within the look ahead window would enable the strawman algorithm to mine the edges from the reference node to its children (here T2→T3 and T2→T6), the limitation and concerning issue with this approach is that the algorithm will also mine edges to the downstream CFG descendants of the reference node (i.e., T4, T5, T7, T8, T9). Consequently, instead of mining the two desired children of T2, the algorithm will end mining lots of redundant edges from the reference node to the downstream descendants. Further, if the reference node occurrence frequency is less, then this algorithm can also lead to mining noisy edges as a consequence of high amount of noisy candidates coming within the look ahead window and seeming as correlated events by chance. Although one may envision running a transitive-edge removal algorithm on the bloated-cfg mined by this strawman algorithm, note that the transitive-edge removal will end up removing valid detour paths. For many practical datasets, the occurrence of multiple detour paths existing between two nodes is fairly common, and thereby will lead to mining an incorrect CFG.

To summarize the limitations of the strawman approach described above—the presence of interleaving implies that the immediately succeeding logline occurring after a reference node could be a noisy candidate, which requires looking beyond the immediate logline up to a look ahead window comprising multiple loglines occurring within some time lag threshold. Resorting to a look ahead window of size greater than 1 (i.e., going beyond the immediately succeeding logline), however, results in mining undesired edges to downstream descendants and also to noisy candidates.

To overcome the above limitations of the above strawman approach of mining template sequences from interleaved logs, a two-stage approach is proposed. In the first-stage (FIG. 6), the Nearest-Neighbor-Groups (NNS) groups of each reference cfg node or templateid are computed. The benefit of this first-stage of computing NNS groups is that if the immediately succeeding logline of a reference templateid is not found in the input logstream, it is NOT part of the NNS Group of the reference template. This implies the occurrence of this succeeding logline is purely coincidental and is essentially one of the noisy candidate templateids that co-occurred due to the artifacts of interleaving. The details of the second-stage (FIG. 7) of the algorithm are described and the NNS Groups are defined, followed by how the avoidance of the limitations of the previous strawman is approached.

The NNS group (see FIG. 6) of a reference cfg node is a set of other templateids that are observed to statistically temporally co-occur with the reference template. NNS groups of each reference template can be computed by analyzing the time-series of each template, wherein the time-series of each template captures the timestamps or time-bins wherein that particular template occurred in the logstream.

The time-series of each template can be constructed from the input logstream and the knowledge of the list of template patterns, which enables mapping each logline to the corresponding templateid that it corresponds to. So essentially the input logstream can be viewed as a stream of different templates occurring at the monotonically increasing timestamps associated with the input logstream. Another view of the input logstream is the set of time-series of each template.

Given the time-series of each template, one embodiment of computing the NNS Group of each reference template, can be done by running a scalable Nearest-Neighbor-Search (NNS) algorithm like Locality-Sensitive-Hashing (LSH) based MinHash algorithm. The input feature vectors associated with each template can be constructed by discretizing the time-series into a frequency of occurrence in each time-bin, wherein the time-bin-width is the time-discretization granularity, and should be approximately a few multiples (at most 10 times) of the average lag of CFG edges. With such a time-series discretization, temporally co-occurring templates will have statistically significant overlap in the time-bin identifiers where they occur.

Figure 6:
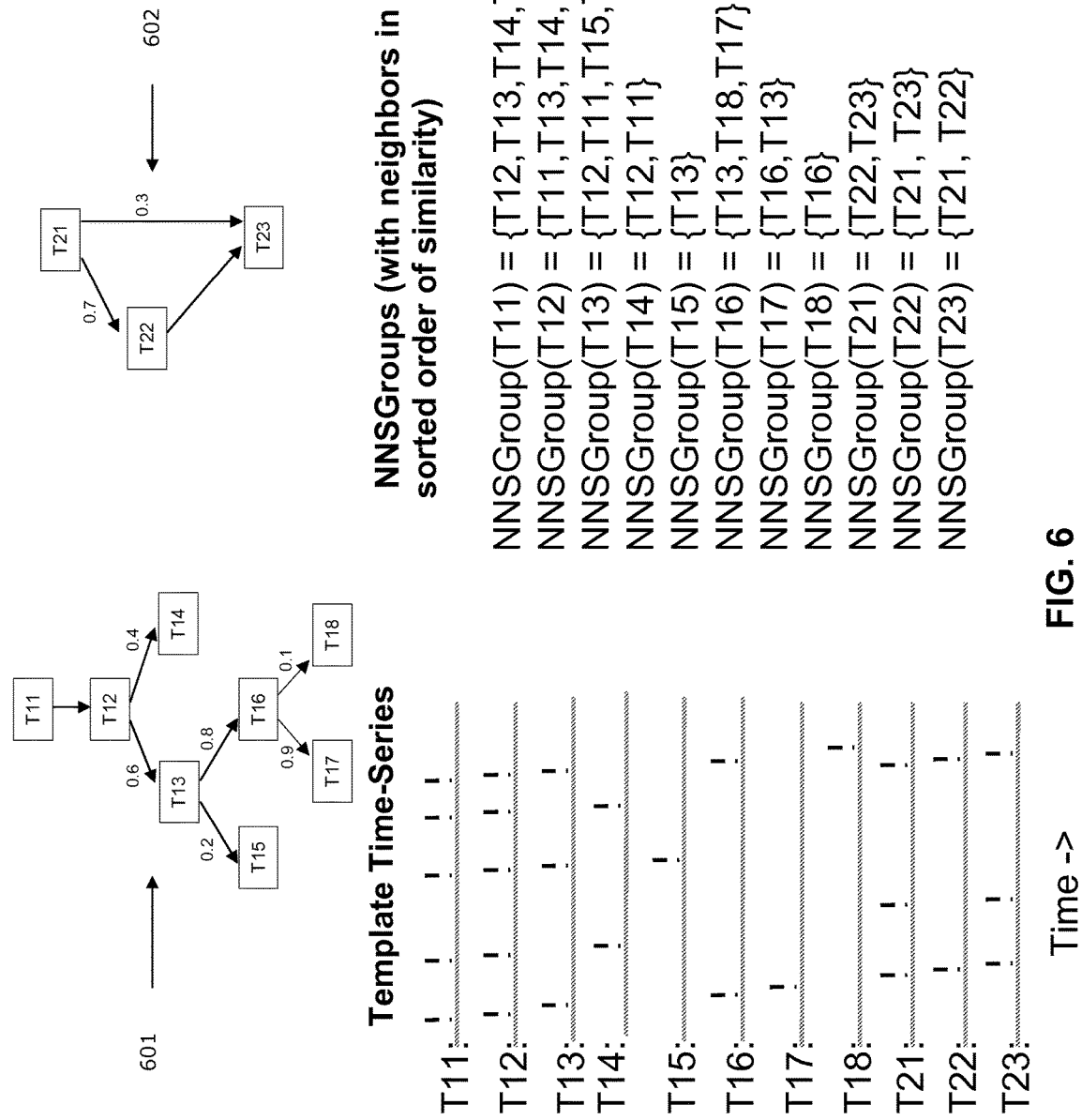
FIG. 6 provides an illustrative example of the sub-step of computation of Nearest-Neighbor-Groups (NNS) using the time-series of each template.

FIG. 6 shows an example CFG (601), and how the time-series of a few CFG nodes (602) look. The figure conveys that the NNS groups of a template are those templates whose time-series have a statistically significant overlap with the time-series of the reference template. In contrast, the time-series of templates that are not temporally correlated with the reference template will have a time-series that has very low (coincidental) overlaps. Also observe from the example, the NNS group of a template are limited to nodes within its own CFG, since nodes from other CFGs cannot make it to the NNS Group since their executions are un-correlated and overlaps are purely accidental, as shown in the NNS Group of templates in CFG 601 not having templates of CFG 602 and vice versa. Further notice that sibling nodes from the same CFG also do not make it to the NNS group since siblings are also un-correlated, as shown by the NNS Group (T13) not containing T14 and vice versa. The immediate predecessors and successors would make it to the NNS Group. Additionally, even parents of the predecessors and downstream descendants up to a few levels can potentially make it to the NNS Group if the effective path-probabilities of the descendants are similar to the reference node. However, downstream descendants or upstream ancestors that are several levels deeper or lesser respectively, will typically not make it to the NNS Group, as shown by the example of NNS Group (T12) not containing T17 or T18.

This implies that the members of the NNS groups are essentially those which have a Jacquard-Set-Similarity metric (i.e., number overlapped_time_bins/union_of_total_timebins). Although one can resort to a brute-force algorithm of computing the Jacquard-Similarity metric between the $O(T^2)$ (i.e., quadratic complexity) template-to-template pairs (T being the total number of templates), such a brute-force algorithm will have scalability issues since the number of dimensions or number of time-bins can be large coupled with the $O(T^2)$ comparisons that need to be made. This can be done efficiently via using the LSH based MinHash algo of complexity-order O(T) (i.e., linear complexity) to detect nearest-neighbors that have even a time-series overlap threshold of say 10%.

Figure 7:
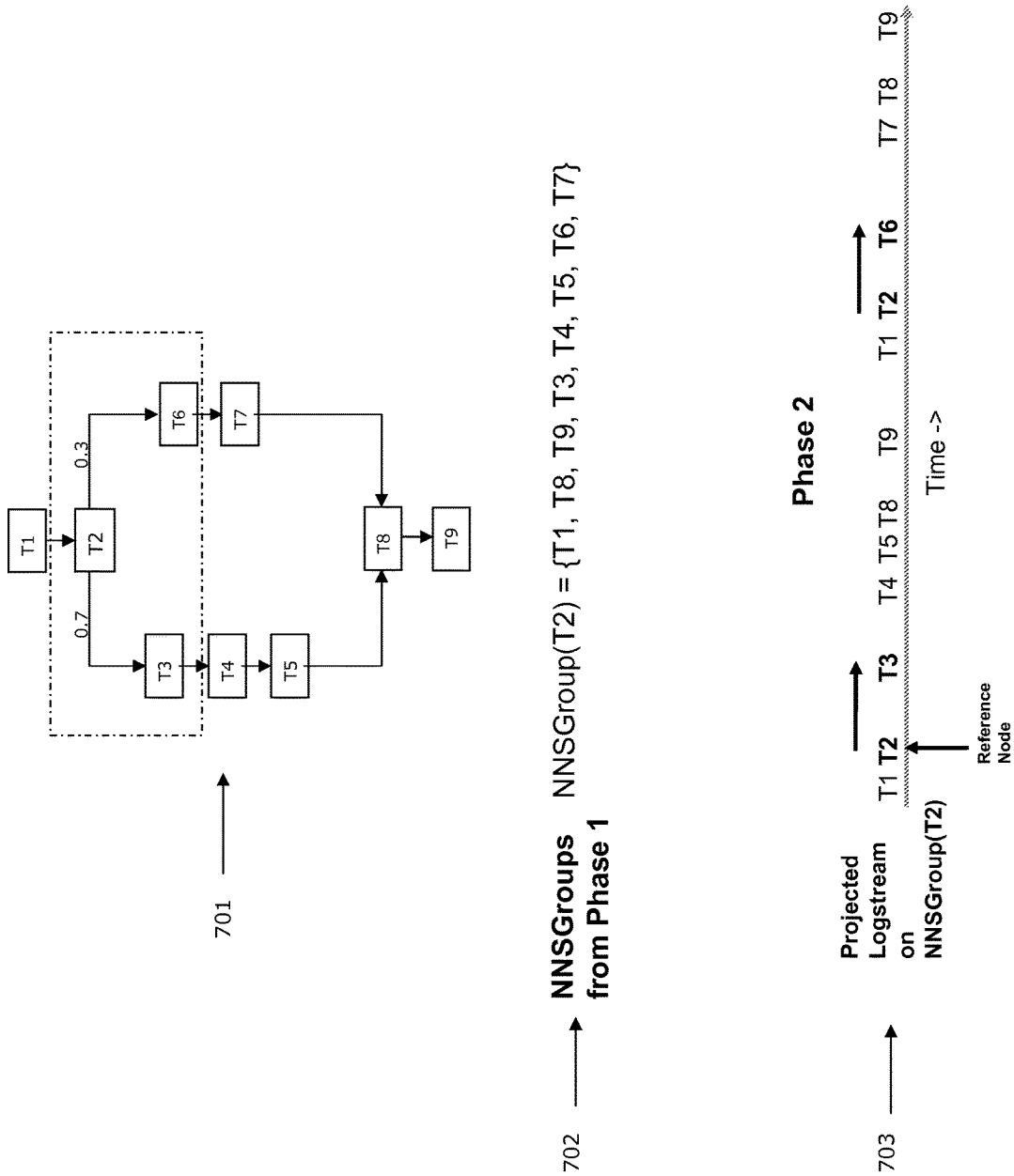
FIG. 7 provides an illustrative example of the two-stage approach for mining template sequences.

Once the NNS Groups of each template in the first-stage are computed, the second-stage of the algorithm, depicted in FIG. 7, leverages this pre-computed NNS Group information of each template in an interesting way to avoid the limitations of the prior strawman approach described before. Observe that in the strawman approach, not knowing whether the immediately succeeding logline of a reference template is a noisy candidate or not, the counter of all templateids within the bounded look ahead window can be incremented. It is interesting that in the pre-computed information of the NNS Group of the reference template (see 702), only the increment of the counter of the first template that succeeds the reference template pre-conditioned on the fact that the succeeding template must belong to the NNS Group of the reference template (here T2). Further, the look ahead can be pre-empted the moment such a template is found, thereby implying that a successor edge is created only to the first NNS Group member that follows the reference template. Another way of interpreting this algorithm is that in order to create the successor edges of a reference template, there is a consideration of a projection of the input logstream on the NNS Group of that reference template (see 703) as shown in FIG. 7. This projection essentially implies that the noisy candidates do not exist in the projected logstream, as shown in the figure.

This second-stage of this algorithm can be realized by making a single-pass of the input logstream, and tracking for each NNS Group, which was the 'last_member_seen' and the 'last_time_seen' in each NNS Group, and creating edges only when the last_member_seen is the same as the reference template of the NNSGroup and the ((current_time–last_time_seen)<application-lag-threshold). When the next line of the input logstream is processed, the last_member_seen and last_time_seen in all the NNSGroups the current template is part of is then updated.

The benefit of this two-stage approach (in contrast to the single-stage strawman approach) is twofold—(1) the avoidance of mining edges to noisy nodes since counters of non-NNS Group members is not incremented, and (2) the avoidance of mining edges to downstream descendants since the look ahead is stopped on finding the first instance of a NNS Group member after the reference template.

For each template, once the successor edges and also the relative normalized values of the counters of the NNS Group members are computed, the relative branching probabilities of the successor edges of each template can be computed. Further, the temporal vicinity or successor edges of each template can be stitched together to construct the desired CFG.

Figure 8:
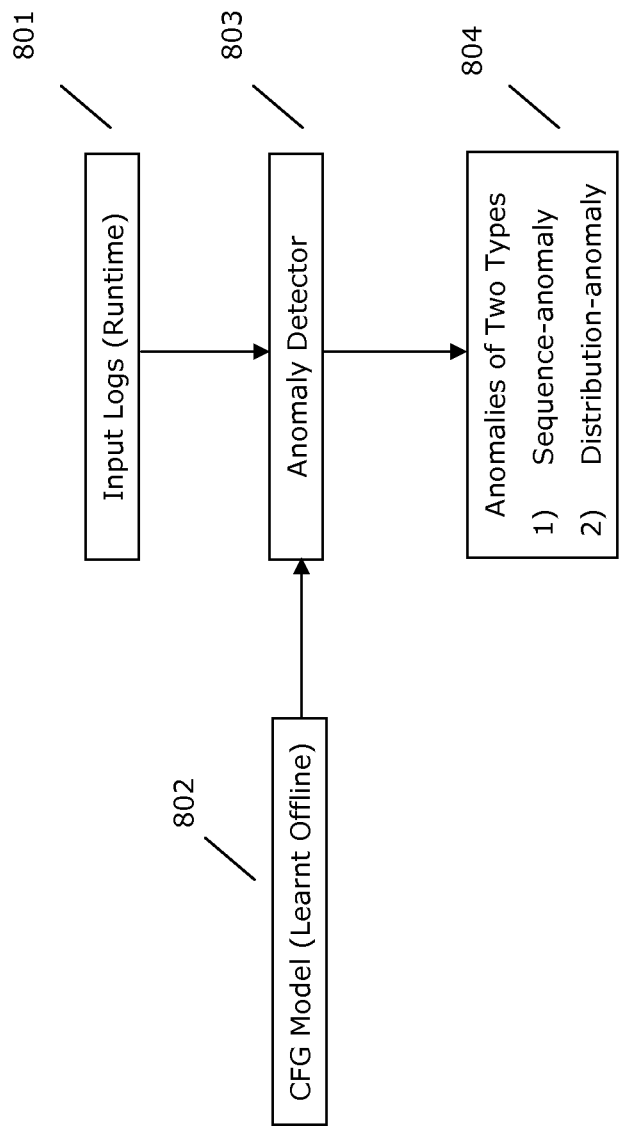
FIG. 8 provides an illustrative example of the inputs/outputs of the anomaly detector phase.
Figure 9:
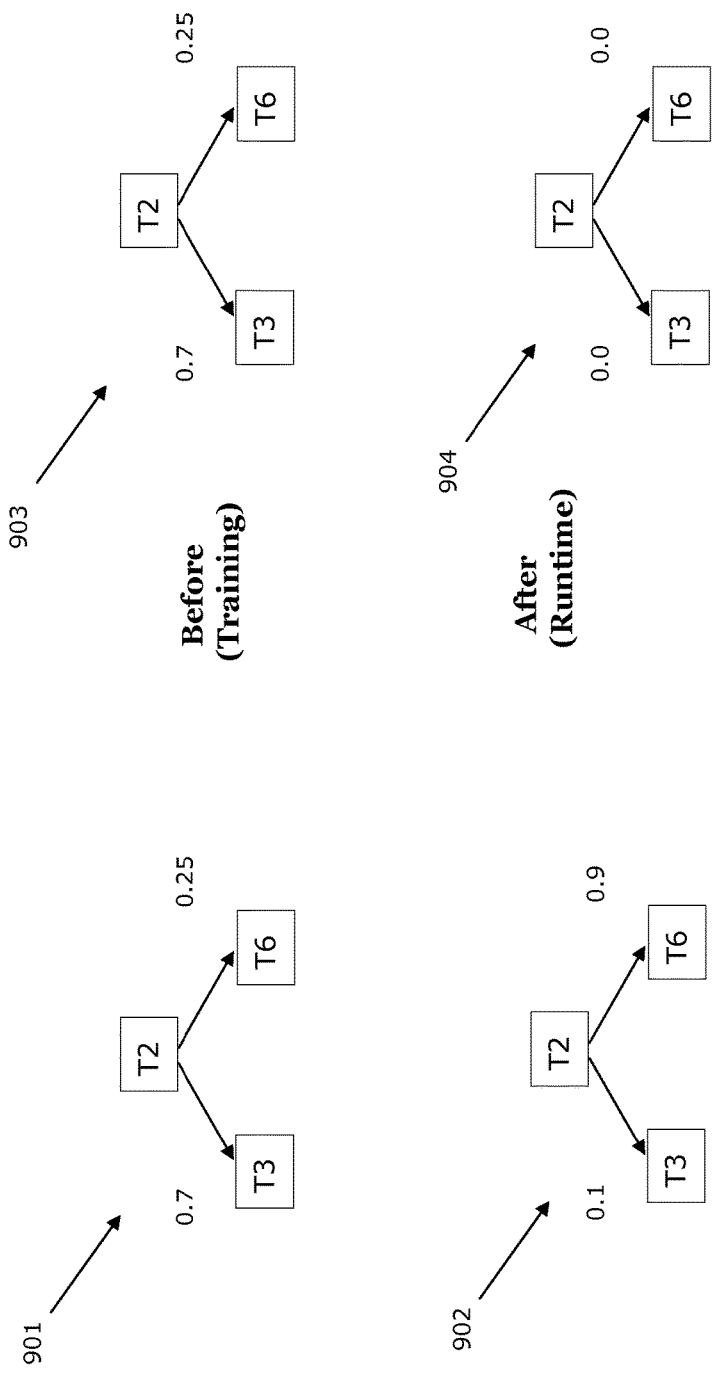
FIG. 9 provides an illustrative example of two types of anomalies that are detected and alerted by the anomaly detection phase.

Once the training phase cfg model (802) is mined it can be used to pinpoint anomalies at run-time, as shown in FIG. 8. Note that the cfg is basically a graph model where nodes represent templates and edges represent template sequences. Edge weights are the branching factor probabilities that determine how often successor template is expected to follow the predecessor one. Note that the aggregate children probability can be less than 1 (i.e., 100%). This is because some children occurred with such low probability that is it difficult to separate them from the noise. A threshold is used (example 5%) below which validates children occurrences that will be filtered away with the noise. However the threshold can be configured and reduced further, in which case the probability of noisy edges making its way into the CFG increases.

Anomalies generated (804): (1) type of anomaly and (2) score of anomaly. The type of an anomaly signifies the under-lying reason of why it is an anomaly. The score of an anomaly signifies its severity.

There are two distinct types of anomalies (as mentioned in 804) that can be detected using a CFG model. (a) Distribution anomalies where a shift is observed in branching factor probabilities in the observed logs from the learnt model. For example, in (901) the branching probability of T2->T3 decreased substantially from 0.7 in learnt model to 0.1 in the observed logs (902) over a predefined interval T. Similar changes are noticed for T2->T6. These are raised as distribution anomalies. Note that distribution anomalies are computed once in T seconds where T is pre-configurable. Advantages of distribution anomalies are that they can be very fine-grained and shift in a distribution is captured very well. The disadvantage is that they may generate a lot more false positives due to temporary shift in workload (b). Sequence anomalies are those that get alerted where a learnt sequence is violated. For example, for a linear sequence if the child is not seen within an expected time period, it can be contrasted to the learnt model behavior of T2 being followed by either T3 or T6 (903). This can be observed in the runtime logs where neither T3 nor T6 are seen to follow T2 within an expected time interval (904). Hence this is raised as a sequence anomaly. Sequence anomalies are raised instantaneously when the expected duration timeout occurs and no child of a template is seen. Hence, this type of anomaly messages is more real-time. The advantage of sequence anomalies is that there are very few in number and high precision. Also most sequence anomalies can generate actionable insights, i.e., deeper investigation into why a particular message type was not seen.

The anomaly score is computed differently for distribution and sequence anomalies. For distribution anomaly the score is given by the graph difference score (capturing changes in the edge weights in addition to additions/removal of nodes/edges) between the training and runtime graphs. The bigger the shift in branching probability distribution, the larger is the graph diff score. The sequence anomaly score is the aggregate children probability. This signifies the probability of violating the condition that none of the children was seen at runtime within an expected time period.

In view of the foregoing, it can be appreciated that various advantages may be enjoyed in accordance with at least one embodiment of the invention. Among these are scalable algorithms to mine high-quality templates and sequential patterns of templates, which can subsequently be used to construct a more efficient CFG. This CFG can be analyzed to more effectively pinpoint anomalies during run-time.

Figure 10:
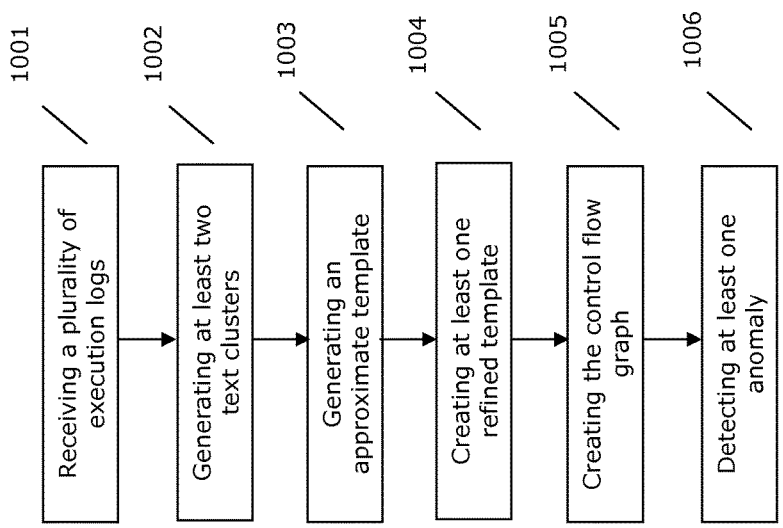
FIG. 10 sets forth a process more generally for efficiently mining a control flow graph from execution logs of a distributed system.

Referring to FIG. 10, as illustrated herein, embodiments provide a method of efficiently mining a control flow graph from execution logs of a distributed system, said method comprising via utilizing at least one processor to execute computer code that performs the steps of: receiving a plurality of execution logs (1001), generating, using at least one text clustering technique, at least two text clusters, from the plurality of execution logs (1002), generating at least one approximate template based on the at least two text clusters (1003), creating at least one refined template via refining the at least one approximate template using multimodal sequencing (1004), creating the control flow graph, based on the at least one refined template (1005), and detecting at least one anomaly in the control flow graph (1006).

It can be appreciated from the foregoing that, in accordance with at least one embodiment of invention, a technical improvement is represented at least via provision of methods and arrangements which permit scalable high precision mining of CFG from logs via using text similarity, CFG neighborhood, and temporal information.

Figure 11:
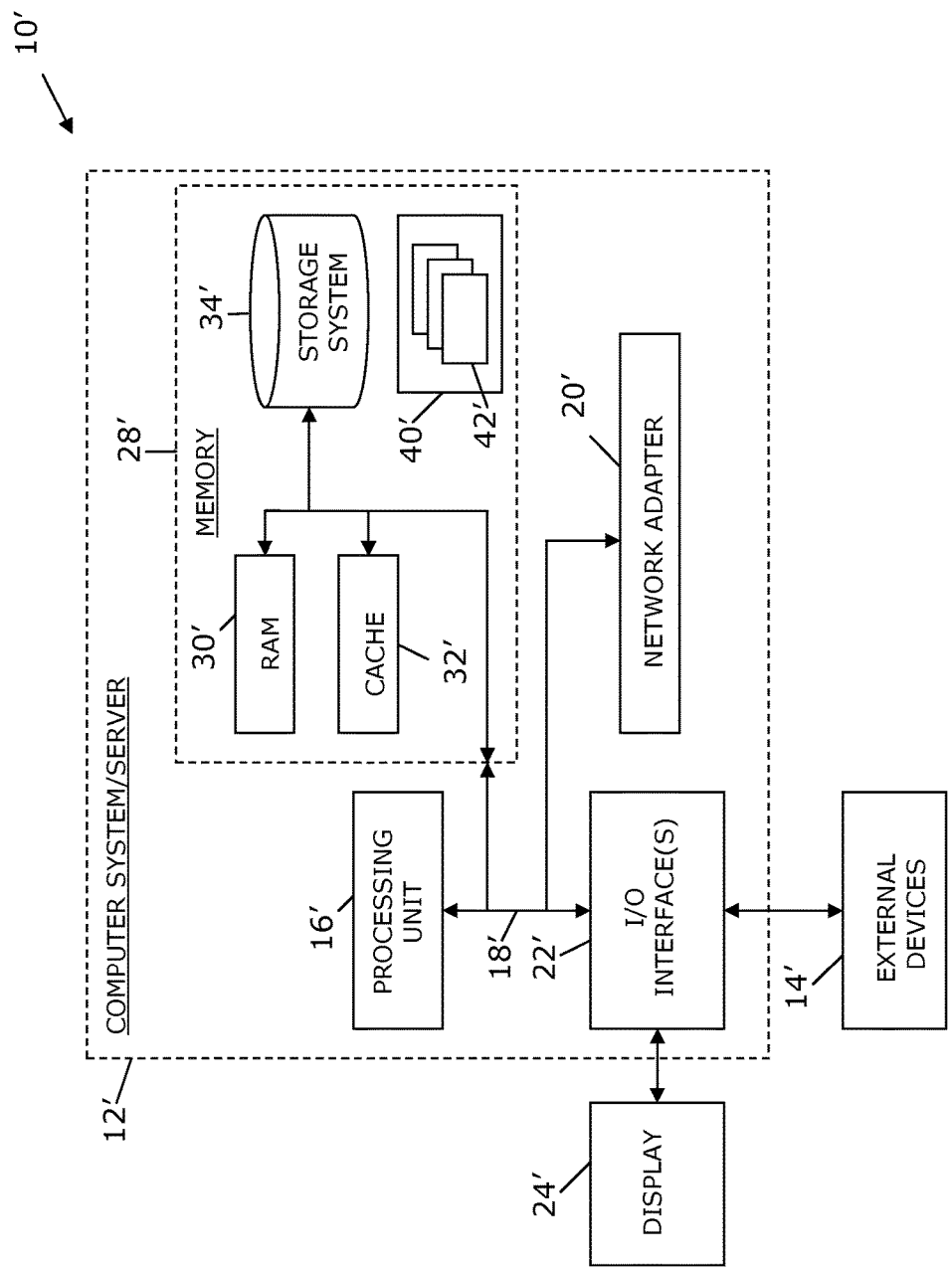
FIG. 11 illustrates a computer system.

Referring now to FIG. 11, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for efficiently mining a control flow graph from execution logs of a distributed system, said apparatus comprising:
   at least one processor; and
   a computer readable storage medium having computer readable program code embodied therewith and executable by the at least one processor, the computer readable program code comprising:
   computer readable program code that receives a plurality of execution logs;
   computer readable program code that mines at least one template from the plurality of execution logs in a first-phase, wherein the mining comprises computer readable program code that creates at least one template via a two-stage template mining technique, comprising:
   a first stage of the two-stage template mining technique comprising computer readable program code that creates approximate-templates via a dictionary based logline transformation in order to attain scalability; and
   a second second-stage of the two-stage template mining technique comprising computer readable program code that refines the mined approximate-templates by leveraging the multimodal (text+temporal-vicinity) signature of each approximate-template; and
   computer readable program code that generates the control-flow graph between the mined templates in a second phase via a two-stage technique comprising:
   a first-stage of the second phase comprising computer readable program code that creates, for each template, a set of the template's temporally co-occurring templates via leveraging a time-series of occurrence of each template; and
   a second-stage of the second phase comprising computer readable program code that determines, in a single-pass of the log stream for each template, the template's immediate predecessors/successor on the temporally co-occurring templates and computer readable program code that stitches mined successors of each template to construct the control flow graph.

2. A computer program product to efficiently mine a control flow graph from execution logs of a distributed system, said computer program comprising:
   at least one processor; and
   a computer readable storage medium having computer readable program code embodied therewith and executable by the at least one processor, the computer readable program code comprising:

computer readable program code that receives a plurality of execution logs;

computer readable program code that mines at least one template from the plurality of execution logs in a first-phase, wherein the mining comprises computer readable program code that creates at least one template via a two-stage template mining technique, comprising:

a first stage of the two-stage template mining technique comprising computer readable program code that creates approximate-templates via a dictionary based logline transformation in order to attain scalability; and a second second-stage of the two-stage template mining technique comprising computer readable program code that refines the mined approximate-templates by leveraging the multimodal (text+temporal-vicinity) signature of each approximate-template; and computer readable program code that generates the control-flow graph between the mined templates in a second phase via a two-stage technique comprising:

a first-stage of the second phase comprising computer readable program code that creates, for each template, a set of the template's temporally co-occurring templates via leveraging a time-series of occurrence of each template; and a second-stage of the second phase comprising computer readable program code that determines, in a single-pass of the log stream for each template, the template's immediate predecessors/successor on the temporally co-occurring templates and computer readable program code that stitches mined successors of each template to construct the control flow graph.

3. The computer program product according to claim 2, wherein the plurality of execution logs comprises raw log lines.

4. The computer program product according to claim 2, further comprising:

computer readable program code that compares the created control flow graph to at least one previously stored control flow graph;

computer readable program code that identifies, based on said comparing, at least one anomaly; and wherein the at least one identified anomaly is selected from the group consisting of: a sequence anomaly and a distribution anomaly.

5. The computer program product according to claim 2, wherein said mining comprises computer readable program code that utilizes at least one text-clustering technique selected from the group consisting of: an edit-distance technique and a dictionary-based logline parameterization.

6. The computer program product according to claim 5, wherein the dictionary-based logline parameterization comprises identifying keywords and parameters for each of the plurality of execution logs.

7. The computer program product according to claim 6, wherein the identifying comprises employing a frequency analysis of words for each of the plurality of execution logs.

8. A method of efficiently mining the control flow graph from execution logs of a distributed system, said method comprising:

utilizing at least one processor to execute computer code that performs the steps of:

receiving a plurality of execution logs;

mining at least one template from the plurality of execution logs in the first-phase;

said mining comprising creating at least one template, via employing a two-stage template mining technique;

said first-stage creating approximate-templates via a dictionary based logline transformation in order to attain scalability and said second-stage refining the mined approximate-templates by leveraging the multimodal (text+temporal-vicinity) signature of each approximate-template; and generating the control-flow graph between the mined templates in the second-phase via a two-stage technique;

said first-stage creating for each template, the set of its temporally co-occurring templates, referred to as its Nearest-Neighbor-Group, by leveraging the time-series of occurrence of each template; and said second-stage, in a single-pass of the logstream, determining for each template, its immediate predecessors/successors by tracking predecessors/successors on the projected logstream on the Nearest-Neighbor group of the template, and stitching the mined successors of each template to construct the desired control flow graph.

9. The method of claim 8, wherein the plurality of execution logs comprises raw log lines.

10. The method according to claim 8, further comprising:

comparing the created control flow graph to at least one previously stored control flow graph;

identifying, based on said comparing, at least one anomaly; and wherein the at least one identified anomaly is selected from the group consisting of: a sequence anomaly and a distribution anomaly.

11. The method according to claim 8, wherein said mining comprises utilizing at least one text-clustering technique selected from the group consisting of: an edit-distance technique and a dictionary-based logline parameterization.

12. The method according to claim 11, wherein the dictionary-based logline parameterization comprises identifying keywords and parameters for each of the plurality of execution logs.

13. The method according to claim 12, wherein said identifying comprises employing a frequency analysis of words for each of the plurality of execution logs.

* * * * *